United States Patent
Ayabe et al.

(10) Patent No.: US 12,202,480 B2
(45) Date of Patent: Jan. 21, 2025

(54) CONTROL SYSTEM AND CONTROL METHOD FOR VEHICLE

(71) Applicant: TOYOTA JIDOSHA KABUSHIKI KAISHA, Toyota (JP)

(72) Inventors: Atsushi Ayabe, Toyota (JP); Takeshi Yasuda, Kuwana (JP); Akihiro Kitao, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 225 days.

(21) Appl. No.: 18/070,629

(22) Filed: Nov. 29, 2022

(65) Prior Publication Data

US 2023/0234584 A1   Jul. 27, 2023

(30) Foreign Application Priority Data

Jan. 26, 2022   (JP) .................................. 2022-010441

(51) Int. Cl.

| | |
|---|---|
| *B60W 30/14* | (2006.01) |
| *B60T 17/08* | (2006.01) |
| *B60W 10/04* | (2006.01) |
| *B60W 10/18* | (2012.01) |
| *B60W 30/02* | (2012.01) |
| *B60W 50/08* | (2020.01) |

(52) U.S. Cl.
CPC ......... *B60W 30/146* (2013.01); *B60T 17/081* (2013.01); *B60W 10/04* (2013.01); *B60W 10/18* (2013.01); *B60W 30/02* (2013.01); *B60W 50/08* (2013.01)

(58) Field of Classification Search
CPC .... B60W 30/146; B60W 10/04; B60W 10/18; B60W 30/02; B60W 50/08; B60T 17/081
USPC .......................................................... 701/70
See application file for complete search history.

(56) References Cited

U.S. PATENT DOCUMENTS

| | | | |
|---|---|---|---|
| 2004/0070372 A1* | 4/2004 | Kawai ....................... | H02J 1/08 290/40 R |
| 2006/0041360 A1* | 2/2006 | Post .................... | B60G 17/0195 701/1 |
| 2007/0067085 A1* | 3/2007 | Lu ........................ | B60W 40/114 340/440 |

(Continued)

FOREIGN PATENT DOCUMENTS

JP   2021-049990 A   4/2021

*Primary Examiner* — Manglesh M Patel
(74) *Attorney, Agent, or Firm* — Dinsmore & Shohl LLP

(57) ABSTRACT

A control system includes a plurality of request generation devices each of which outputs first and second requests based on a request generated by at least one application, an arbitrator that arbitrates the first and second requests and that outputs a single first request and a single second request, and a control apparatus that controls an actuator based on a final request obtained by arbitrating the first and second requests from the arbitrator and a request made by a driver. The arbitrator specifies the request generation device that has output a request corresponding to the final request based on the final request, the self-output first request, and the self-output second request. The request generation device specified by the arbitrator specifies the application that has generated the request corresponding to the final request based on the self-output first request, the self-output second request, and the request made by the driver.

6 Claims, 3 Drawing Sheets

(56) References Cited

U.S. PATENT DOCUMENTS

| | | | |
|---|---|---|---|
| 2007/0129815 A1* | 6/2007 | Flemisch | G05B 7/02 |
| | | | 700/11 |
| 2008/0087509 A1* | 4/2008 | Kalbeck | B60T 7/12 |
| | | | 701/70 |
| 2010/0250083 A1* | 9/2010 | Takahashi | B60W 10/18 |
| | | | 701/70 |
| 2011/0006591 A1* | 1/2011 | Yoshii | B60T 13/745 |
| | | | 303/4 |
| 2011/0106381 A1* | 5/2011 | Filev | B60W 50/08 |
| | | | 701/40 |
| 2012/0109482 A1* | 5/2012 | Yoshii | B60T 8/4872 |
| | | | 701/70 |
| 2012/0203399 A1* | 8/2012 | Filev | B60W 30/02 |
| | | | 701/1 |
| 2014/0107867 A1* | 4/2014 | Yamashiro | B60W 10/18 |
| | | | 701/2 |
| 2015/0142292 A1* | 5/2015 | Kastner | B60W 40/04 |
| | | | 701/96 |
| 2016/0332622 A1* | 11/2016 | Shiraishi | B60T 7/22 |
| 2018/0170381 A1* | 6/2018 | Kamatani | B60W 30/16 |
| 2020/0070802 A1* | 3/2020 | Yamada | B60W 30/02 |
| 2020/0180632 A1* | 6/2020 | Morita | B60W 30/14 |
| 2020/0189600 A1* | 6/2020 | Tsuji | B60W 60/0011 |
| 2021/0070265 A1* | 3/2021 | Roether | B60W 10/20 |
| 2021/0213974 A1* | 7/2021 | Shimbo | B60W 30/09 |
| 2021/0370924 A1* | 12/2021 | Kuno | B60W 30/0956 |
| 2022/0194376 A1* | 6/2022 | Kitahara | B60W 60/0013 |
| 2023/0192049 A1* | 6/2023 | Marx | B60T 7/042 |
| | | | 701/70 |

* cited by examiner

CONTROL SYSTEM AND CONTROL METHOD FOR VEHICLE

CROSS-REFERENCE TO RELATED APPLICATION

This application claims priority to Japanese Patent Application No. 2022-010441 filed on Jan. 26, 2022, incorporated herein by reference in its entirety.

BACKGROUND

1. Technical Field

The present disclosure relates to a control system and a control method for a vehicle having at least one actuator.

2. Description of Related Art

Conventionally, there is known a control apparatus that is mounted in a vehicle and that includes an arbitration unit that accepts a plurality of first requests from a plurality of applications realizing a driving support function and that arbitrates the accepted first requests, and a first output unit that outputs instructive information for driving an actuator based on a result of arbitration by the arbitration unit (e.g., see Japanese Unexamined Patent Application Publication No. 2021-049990 (JP 2021-049990 A)). In this control apparatus, each of the first requests includes a piece of identification information (an identifier) on the corresponding one of the applications as well as a requested acceleration and a piece of information for controlling the movement of the vehicle in a lateral direction thereof from the corresponding one of the applications. Thus, by laying open the piece of identification information on the application that has generated that one of the first requests which has been selected by the arbitration unit, the application to be executed preferentially can be specified with reference to the piece of identification information. Therefore, each of the applications can be executed properly.

SUMMARY

However, the number of applications mounted in the control system for the vehicle varies in accordance with the specification and the like of the vehicle. Thus, in the case where pieces of identification information are assigned to the individual applications respectively, the specification of the entire control system needs to be changed, for example, every time a new application is added. Therefore, the control system for the vehicle is required to specify the application that has generated a request that is eventually reflected on the control of the actuator without assigning pieces of identification information to the applications respectively, with a view to suppressing a rise in cost and the like.

It is thus a main object of the present disclosure to provide a control system and a control method for a vehicle that make it possible to specify that one of a plurality of applications which has generated a request that is eventually reflected on the control of an actuator, without assigning pieces of identification information to the applications respectively.

A control system for a vehicle of the present disclosure is a control system for a vehicle having at least one actuator. The control system includes a plurality of request generation devices each of which is mounted with at least one application that independently generates a request to the actuator and each of which outputs a single first request and a single second request that are based on the request generated by the at least one application, an arbitrator that arbitrates the first requests and the second requests from the request generation devices and that outputs the single first request and the single second request, and an actuator control apparatus that controls the actuator based on a final request that is obtained by arbitrating the first request and the second request from the arbitrator and a request made by a driver of the vehicle. The actuator control apparatus transmits the final request to the arbitrator. The arbitrator specifies the request generation device that has output the first or second request corresponding to the final request, based on the final request from the actuator control apparatus, the self-output first request, and the self-output second request, and notifies the request generation devices of a result of specification. The request generation device specified by the arbitrator specifies the application that has generated the request corresponding to the final request, based on the self-output first request, the self-output second request, and the request made by the driver.

Besides, a control method for a vehicle of the present disclosure is a control method for a vehicle including at least one actuator, a plurality of request generation devices each of which is mounted with at least one application that independently generates a request to the actuator and each of which outputs a single first request and a single second request that are based on the request generated by the at least one application, an arbitrator that arbitrates the first requests and the second requests from the request generation devices and that outputs the single first request and the single second request, and an actuator control apparatus that controls the actuator based on a final request that is obtained by arbitrating the first request and the second request from the arbitrator and a request made by a driver of the vehicle. The control method includes causing the actuator control apparatus to transmit the final request to the arbitrator, causing the arbitrator to specify the request generation device that has output the first or second request corresponding to the final request, based on the final request from the actuator control apparatus, the self-output first request, and the self-output second request and to notify the request generation devices of a result of specification, and causing the request generation device specified by the arbitrator to specify the application that has generated the request corresponding to the final request, based on the self-output first request, the self-output second request, and the request made by the driver.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Next, a mode for carrying out the present disclosure will be described with reference to the drawings.

Figure 1:
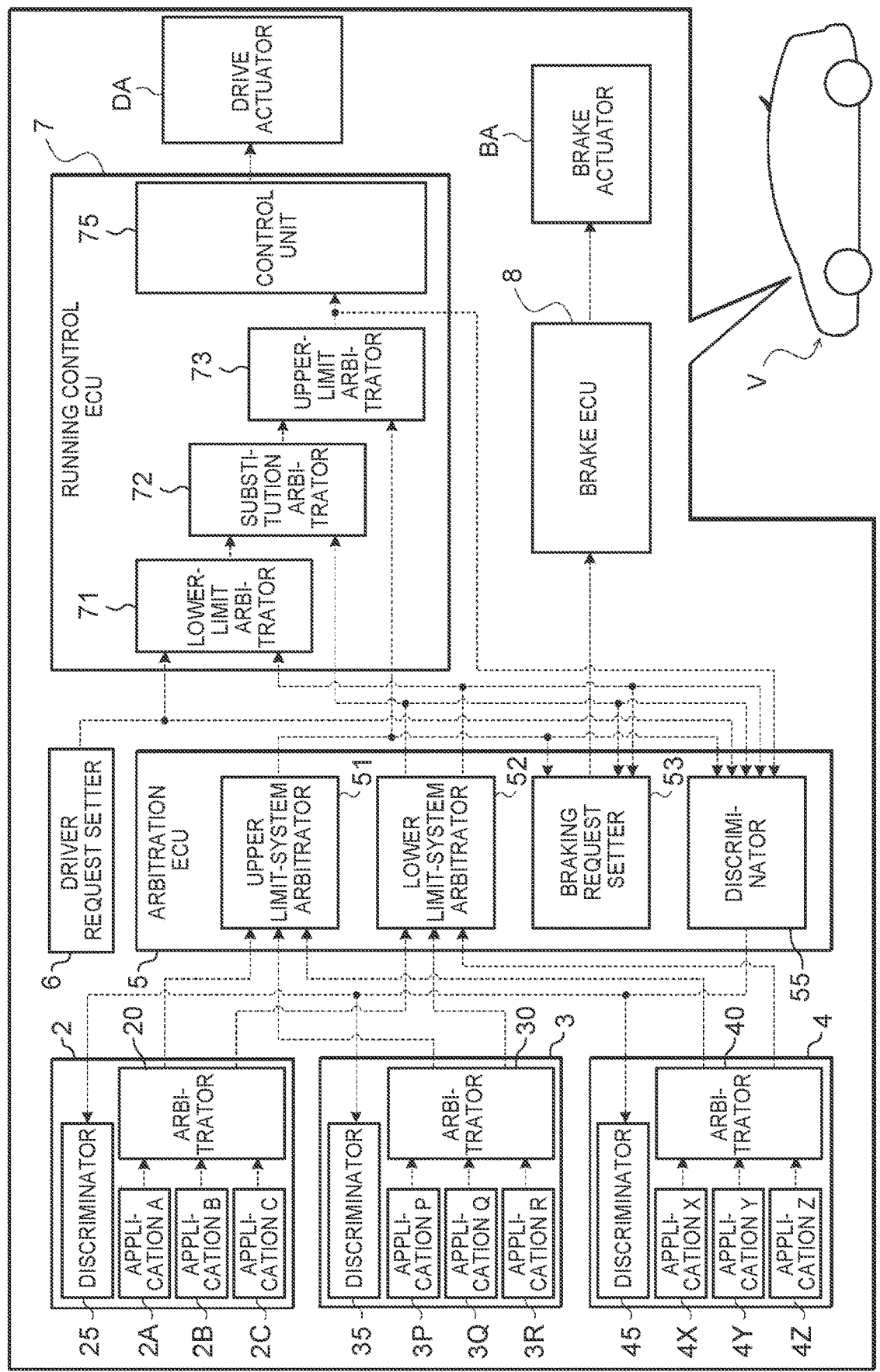
FIG. 1 is a block configuration diagram showing a vehicle that is controlled by a control system of the present disclosure.

FIG. 1 is a block configuration diagram showing a vehicle V that is controlled by a control system 1 of the present disclosure. The vehicle V shown in FIG. 1 includes a drive actuator DA as a motive power generation device that generates a motive power for running, and a brake actuator BA constituting a braking device that applies a braking force to the vehicle V. The drive actuator DA is a motor drive device including a motor-generator (not shown) and an inverter (not shown), a hybrid drive device including an engine (internal combustion engine) (not shown), a motor-generator (not shown), and an inverter (not shown), or a single engine (not shown). Besides, the brake actuator BA is a hydraulic actuator including an electric hydraulic pump (not shown), a plurality of solenoid valves (not shown), and the like. The brake actuator BA supplies hydraulic pressure to wheel cylinders (not shown) provided on wheels of the vehicle V respectively.

As shown in FIG. 1, the control system 1 for the vehicle V includes a plurality of auxiliary electronic control units (hereinafter referred to as "auxiliary ECU's") 2, 3, and 4 as request generation devices, an arbitration electronic control unit (hereinafter referred to as "an arbitration ECU") 5 as an arbitrator in the control system 1, a driver request setter 6, a running control electronic control unit (hereinafter referred to as "a running control ECU") 7 that controls the drive actuator DA, and a brake electronic control unit (hereinafter referred to as "a brake ECU") 8 that controls the brake actuator BA. Each of the auxiliary ECU's 2, 3, and 4, the arbitration ECU 5, the driver request setter 6, the running control ECU 7, and the brake ECU 8 includes a microcomputer having a CPU (not shown), a ROM (not shown), a RAM (not shown), input/output interfaces (not shown), and the like.

The auxiliary ECU's 2, 3, and 4 control corresponding auxiliary devices mounted in the vehicle V respectively. In the present embodiment, the auxiliary ECU 2 controls a plurality of cameras (imaging units) (not shown) mounted in the vehicle V as auxiliary devices. Besides, the auxiliary ECU 3 controls a plurality of clearance sonars (ranging units) (not shown) mounted in the vehicle V as auxiliary devices. Furthermore, the auxiliary ECU 4 controls a plurality of airbag devices (not shown) mounted in the vehicle V as auxiliary devices. At least one application (program) for controlling the corresponding auxiliary devices is installed in each of the auxiliary ECU's 2, 3, and 4.

As shown in FIG. 1, a plurality of applications A, B, and C is installed in the auxiliary ECU 2. The applications A, B, and C are created in advance to independently generate an upper-limit acceleration and a lower-limit acceleration of the vehicle V as a request to the drive actuator DA and the brake actuator BA, based on images imaged by the cameras. Through cooperation between the applications A, B, and C (pieces of software) and pieces of hardware such as the CPU, the ROM, and the RAM, a first request generation module 2A corresponding to the application A, a second request generation module 2B corresponding to the application B, and a third request generation module 2C corresponding to the application C are structured in the auxiliary ECU 2. Furthermore, as shown in FIG. 1, the auxiliary ECU 2 includes an arbitrator 20 and a discriminator 25 that are structured through cooperation between other applications installed separately and pieces of hardware such as the CPU.

In the present embodiment, the first request generation module 2A generates (calculates) a lower-limit acceleration (a second request) of the vehicle V for maintaining a vehicle-to-vehicle distance between the vehicle V and a preceding vehicle based on an image imaged by the camera or the like installed at a front portion of the vehicle V at intervals of a predetermined time, and gives the generated lower-limit acceleration to the arbitrator 20, while a driver of the vehicle V issues instructions to perform vehicle-to-vehicle distance control (adaptive cruise control) by operating a switch (not shown) or the like. Besides, the second request generation module 2B generates (calculates) an upper-limit acceleration (a first request) of the vehicle V such that the vehicle speed of the vehicle V does not exceed a certain vehicle speed with reference to the image imaged by the camera or the like installed at the front portion of the vehicle V at intervals of a predetermined time, and gives the generated upper-limit acceleration to the arbitrator 20, while the driver of the vehicle V issues instructions to perform constant-speed running control (adaptive cruise control). Furthermore, the third request generation module 2C generates (sets) a lower-limit acceleration (a second request) of the vehicle V, and gives the generated lower-limit acceleration to the arbitrator 20 when an abnormality in the driver of the vehicle V is sensed based on an image imaged by the camera or the like installed in a vehicle interior.

Besides, in the present embodiment, the first and third request generation modules 2A and 2C corresponding to the application A or C give the lower-limit acceleration and an accelerator override prohibition request to invalidate the operation of an accelerator pedal (not shown) by the driver of the vehicle V (a request for a driving force) to the arbitrator 20, if necessary. Incidentally, the first, second, and third request generation modules 2A, 2B, and 2C set an extremely large value or an extremely small value as the upper-limit acceleration or the lower-limit acceleration such that no influence is exerted on other kinds of control, when the corresponding application A, B, or C is not executed in accordance with instructions or the like from the driver.

The arbitrator 20 of the auxiliary ECU 2 outputs a single upper-limit acceleration (a first request) and a single lower-limit acceleration (a second request) based on upper-limit and lower-limit accelerations generated by the first, second, and third request generation modules 2A, 2B, and 2C, namely, the applications A, B, and C, and stores the upper-limit acceleration and the lower-limit acceleration into the RAM of the auxiliary ECU 2. Furthermore, when the single lower-limit acceleration is accompanied by an accelerator override request, the arbitrator 20 outputs the accelerator override request as well as the lower-limit acceleration. In the present embodiment, the arbitrator 20 directly outputs the upper-limit acceleration generated by the second request generation module 2B as the single upper-limit acceleration, and outputs the smaller one (the selected minimum) of the lower-limit accelerations generated by the first and third request generation modules 2A and 2C, as the single lower-limit acceleration. Incidentally, in the case where a fourth request generation module that generates an upper-limit acceleration of the vehicle V (a first request) is further structured in the auxiliary ECU 2, the arbitrator 20 outputs the smaller one (the selected minimum) of the upper-limit accelerations generated by the second and fourth request generation modules 2B and the like, as the single upper-limit acceleration. Besides, the discriminator 25 of the auxiliary ECU 2 specifies that one of the applications A, B, and C which has generated the upper-limit or lower-limit acceleration that is eventually reflected on the control of the drive actuator DA and the brake actuator BA.

As shown in FIG. 1, a plurality of applications P, Q, and R is installed in the auxiliary ECU 3. The applications P, Q, and R are created in advance to independently generate an upper-limit acceleration and a lower-limit acceleration of the vehicle V as a request to the drive actuator DA and the brake actuator BA, based on detection signals of the clearance sonars. Through cooperation between the applications P, Q, and R (pieces of software) and pieces of hardware such as the CPU, the ROM, and the RAM, a first request generation module 3P corresponding to the application P, a second request generation module 3Q corresponding to the application Q, and a third request generation module 3R corresponding to the application R are structured in the auxiliary ECU 3. Furthermore, as shown in FIG. 1, the auxiliary ECU 3 includes an arbitrator 30 and a discriminator 35 that are structured through cooperation between other applications installed separately and pieces of hardware such as the CPU.

In the present embodiment, the first request generation module 3P generates (calculates) an upper-limit acceleration of the vehicle V (a first request) for preventing the vehicle V from colliding with another vehicle or the like based on detection signals of the clearance sonars, at intervals of a predetermined time, and gives the generated upper-limit acceleration to the arbitrator 30. Besides, the second request generation module 3Q generates (calculates) a lower-limit acceleration of the vehicle V (a second request) for parking the vehicle V at a designated spot based on detection signals of the clearance sonars, at intervals of a predetermined time, and gives the generated lower-limit acceleration to the arbitrator 30 while the driver of the vehicle V issues instructions to perform automated parking control by operating a switch (not shown) or the like. The second request generation module 3Q also gives the lower-limit acceleration and an accelerator override prohibition request to the arbitrator 30, if necessary. Furthermore, the third request generation module 3R generates an upper-limit or lower-limit acceleration of the vehicle V for moving the vehicle V in a predetermined mode based on detection signals of the clearance sonars, at intervals of a predetermined time, and gives the generated upper-limit or lower-limit acceleration to the arbitrator 30. Incidentally, the first, second, and third request generation modules 3P, 3Q, and 3R also set an extremely large value or an extremely small value as the upper-limit acceleration or the lower-limit acceleration such that no influence is exerted on other kinds of control, when the corresponding application P, Q, or R is not executed in accordance with instructions or the like from the driver.

As is the case with the arbitrator 20 of the auxiliary ECU 2, the arbitrator 30 of the auxiliary ECU 3 outputs a single upper-limit acceleration (a first request) and a single lower-limit acceleration (a second request) based on upper-limit and lower-limit accelerations generated by the first, second, and third request generation modules 3P, 3Q, and 3R, namely, the applications P, Q, and R, and stores the upper-limit acceleration or the lower-limit acceleration into the RAM of the auxiliary ECU 3. Furthermore, when the single lower-limit acceleration is accompanied by an accelerator override request, the arbitrator 30 also outputs the lower-limit acceleration and the accelerator override request. Besides, the discriminator 35 of the auxiliary ECU 3 specifies that one of the applications P, Q, and R which has generated the upper-limit or lower-limit acceleration that is eventually reflected on the control of the drive actuator DA and the brake actuator BA.

As shown in FIG. 1, a plurality of applications X, Y, and Z is installed in the auxiliary ECU 4. The applications X, Y, and Z are created in advance to independently generate an upper-limit acceleration and a lower-limit acceleration of the vehicle V as a request to the drive actuator DA and the brake actuator BA, based on actuation states of the airbag devices and the like. Through cooperation between the applications X, Y, and Z (pieces of software) and pieces of hardware such as the CPU, the ROM, and the RAM, a first request generation module 4X corresponding to the application X, a second request generation module 4Y corresponding to the application Y, and a third request generation module 4Z corresponding to the application Z are structured in the auxiliary ECU 4. Furthermore, as shown in FIG. 1, the auxiliary ECU 4 includes an arbitrator 40 and a discriminator 45 that are structured through cooperation between other applications installed separately and pieces of hardware such as the CPU.

In the present embodiment, the first request generation module 4X generates (calculates) an upper-limit acceleration of the vehicle V (a first request) for limiting the output of the drive actuator DA, and gives the generated upper-limit acceleration to the arbitrator 40, when at least one of the airbag devices is actuated. Besides, the second and third request generation modules 4Y and 4Z generate (calculate) an upper-limit or lower-limit acceleration of the vehicle V based on information associated with the airbag devices (detection values of sensors or the like) at intervals of, for example, a predetermined time, and give the generated upper-limit or lower-limit acceleration to the arbitrator 30. Incidentally, the first, second, and third request generation modules 4X, 4Y, and 4Z also set an extremely large value or an extremely small value as the upper-limit acceleration or the lower-limit acceleration such that no influence is exerted on other kinds of control, when the application X, Y, or Z is not executed.

As is the case with the arbitrators 20 and 30 of the auxiliary ECU's 2 and 3, the arbitrator 40 of the auxiliary ECU 4 outputs a single upper-limit acceleration (a first request) and a single lower-limit acceleration (a second request) that are based on the upper-limit and lower-limit accelerations generated by the first, second, and third request generation modules 4X, 4Y, and 4Z, namely, the applications X, Y, and Z, and stores the upper-limit and lower-limit accelerations into the RAM of the auxiliary ECU 4. Besides, the discriminator 45 of the auxiliary ECU 4 specifies that one of the applications X, Y, and Z which has generated the upper-limit or lower-limit acceleration that is eventually reflected on the control of the drive actuator DA and the brake actuator BA.

Incidentally, at least either a plurality of applications that generates an upper-limit acceleration or a plurality of applications that generates a lower-limit acceleration may be installed in each of the auxiliary ECU's 2, 3, and 4. Alternatively, both an application that generates an upper-limit acceleration and an application that generates a lower-limit acceleration may be installed in each of the auxiliary ECU's 2, 3, and 4, or only a single application that generates an upper-limit or lower-limit acceleration may be installed in each of the auxiliary ECU's 2, 3, and 4. In these cases, the arbitrator 20 and the like may be omitted from the auxiliary ECU 2 and the like.

The arbitration ECU 5 includes an upper limit-system arbitrator 51, a lower limit-system arbitrator 52, a braking request setter 53, and a discriminator 55 that are structured through cooperation between applications (pieces of software) installed in the arbitration ECU 5 and pieces of hardware such as the CPU, the ROM, and the RAM. The upper limit-system arbitrator 51 has a plurality of input ports (nodes) connected to corresponding ones of output ports for signals indicating upper-limit accelerations in the auxiliary ECU's 2, 3, and 4, namely, the arbitrators 20, 30, and 40 via dedicated communication lines respectively. The upper limit-system arbitrator 51 selects (arbitrates) the smallest one of the upper-limit accelerations received from the auxiliary ECU's 2, 3, and 4, and outputs a signal indicating the selected single upper-limit acceleration from an output port. Besides, the upper limit-system arbitrator 51 stores the self-output single upper-limit acceleration into the RAM of the arbitration ECU 5 in association with the input port to which the upper-limit acceleration has been supplied, namely, the auxiliary ECU 2, 3, or 4 as a transmission source.

The lower limit-system arbitrator 52 has a plurality of input ports (nodes) connected to corresponding ones of output ports for signals indicating lower-limit accelerations in the auxiliary ECU's 2, 3, and 4, namely, the arbitrators 20, 30, and 40 via dedicated communication lines respectively. The lower limit-system arbitrator 52 selects (arbitrates) the smallest one of the lower-limit accelerations received from the auxiliary ECU's 2, 3, and 4, and outputs a signal indicating the selected single lower-limit acceleration from a first output port. Besides, in the case where the single lower-limit acceleration is accompanied by an accelerator override request, the lower limit-system arbitrator 52 outputs a signal indicating the single lower-limit acceleration from a second output port as a substitution request. Furthermore, the lower limit-system arbitrator 52 stores the self-output single lower-limit acceleration into the RAM of the arbitration ECU 5 in association with the input port to which the lower-limit acceleration has been supplied, namely, the auxiliary ECU 2, 3, or 4 as a transmission source.

The braking request setter 53 sets a braking request to the brake actuator BA, based on an upper-limit acceleration output from the upper limit-system arbitrator 51 and a lower-limit acceleration indicated by a signal output from the first or second output port of the lower-limit-system arbitrator 52. More specifically, the braking request setter 53 calculates a deficiency in a deceleration obtained by the drive actuator DA with respect to a deceleration that is determined from the upper-limit acceleration output from the upper limit-system arbitrator 51 and the lower-limit acceleration indicated by the signal output from the first or second output port of the lower-limit-system arbitrator 52, and outputs a signal indicating the calculated deficiency in deceleration, namely, a braking request from an output port.

The discriminator 55 specifies that one of the auxiliary ECU's 2, 3, and 4 which has output an upper-limit or lower-limit acceleration that is eventually reflected on the control of the drive actuator DA and the brake actuator BA. Besides, as shown in FIG. 1, the discriminator 55 accepts a signal indicating the upper-limit acceleration output from the output port of the upper limit-system arbitrator 51, and signals indicating the lower-limit accelerations output from the first and second output ports of the lower-limit-system arbitrator 52 respectively.

The driver request setter 6 sets an acceleration (including a deceleration) requested by the driver of the vehicle V, based on an accelerator depression amount (a depression amount of the accelerator pedal) detected by an accelerator pedal position sensor (not shown) and a vehicle speed of the vehicle V acquired by a vehicle speed sensor (not shown). The acceleration set by the driver request setter 6 will be referred to hereinafter as "a driver-requested acceleration". The driver request setter 6 gives the driver-requested acceleration to the running control ECU 7 and the discriminator 55 of the arbitration ECU 5.

The running control ECU 7 includes a lower-limit arbitrator 71, a substitution arbitrator 72, an upper-limit arbitrator 73, and a control unit 75 that are structured through cooperation between applications (pieces of software) installed in the running control ECU 7 and pieces of hardware such as the CPU, the ROM, and the RAM. The lower-limit arbitrator 71 has two input ports (nodes) connected to the first output port of the lower limit-system arbitrator 52 of the arbitration ECU 5 and the corresponding one of the output ports of the driver request setter 6 via dedicated communication lines respectively. The lower-limit arbitrator 71 selects the larger one (selects the maximum) of a lower-limit acceleration received from the lower limit-system arbitrator 52 and a driver-requested acceleration received from the driver request setter 6, and outputs a signal indicating the selected lower-limit acceleration or the selected driver-requested acceleration from an output port. Besides, when failing to receive the lower-limit acceleration from the lower limit-system arbitrator 52, the lower-limit arbitrator 71 outputs a signal indicating the driver-requested acceleration received from the driver request setter 6, from the output port.

The substitution arbitrator 72 has two input ports (nodes) connected to the output port of the lower-limit arbitrator 71 and the corresponding second output port of the lower limit-system arbitrator 52 of the arbitration ECU 5 via dedicated communication lines respectively. When receiving a lower-limit acceleration accompanied by an accelerator override request from the lower limit-system arbitrator 52 (the second output port), the substitution arbitrator 72 outputs a signal indicating the lower-limit acceleration from the lower limit-system arbitrator 52 from an output port, regardless of a request from the lower-limit arbitrator 71. That is, when the lower-limit acceleration accompanied by the accelerator override request, namely, a substitution request is output from the arbitration ECU 5, the driver-requested acceleration is invalidated. Besides, when failing to receive the lower-limit acceleration accompanied by the accelerator override request, namely, the substitution request from the lower limit-system arbitrator 52, the substitution arbitrator 72 outputs a signal indicating the lower-limit acceleration or the driver-requested acceleration from the lower-limit arbitrator 71, from the output port.

The upper-limit arbitrator 73 has two input ports (nodes) connected to the output port of the substitution arbitrator 72 and the corresponding one of the output ports of the upper limit-system arbitrator 51 of the arbitration ECU 5 via dedicated communication lines respectively. The upper-limit arbitrator 73 selects the smaller one (selects the minimum) of the lower-limit acceleration or the driver-requested acceleration from the substitution arbitrator 72 and the upper-limit acceleration received from the upper limit-system arbitrator 51, and outputs a signal indicating the selected upper-limit acceleration, lower-limit acceleration, or driver-requested acceleration from an output port. The signal output from the upper-limit arbitrator 73 indicates a final request made by the driver and obtained by arbitrating the upper-limit and lower-limit accelerations from the arbitration ECU 5 and the driver-requested acceleration.

The control unit 75 has an input port (a node) connected to the output port of the upper-limit arbitrator 73. The control unit 75 sets a torque command to the drive actuator DA and the like based on the final request from the upper-limit arbitrator 73, namely, the upper-limit acceleration, the lower-limit acceleration, or the driver-requested acceleration, and detection values of various sensors and the like, and controls the drive actuator DA based on the torque command and the like. Furthermore, as shown in FIG. 1, a signal indicating the upper-limit acceleration, lower-limit acceleration, or driver-requested acceleration output from the output port of the upper-limit arbitrator 73 is transmitted to the discriminator 55 of the arbitration ECU 5.

The brake ECU 8 has an input port (a node) connected to the output port of the braking request setter 53 of the arbitration ECU 5 via a dedicated communication line. The brake ECU 8 sets a command value to the brake actuator BA and the like based on a braking request from the braking request setter 53, a brake pedal stroke (a depression amount of a brake pedal (not shown)) detected by a brake pedal stroke sensor (not shown), a vehicle speed detected by the vehicle speed sensor (not shown), and the like, and controls the brake actuator BA based on the command value and the like.

Subsequently, the procedure of controlling the vehicle V, namely, the drive actuator DA and the brake actuator BA by the control system 1 configured as described above will be described.

While the system of the vehicle V is activated, each of the auxiliary ECU's 2, 3, and 4 (the arbitrators 20, 30, and 40) outputs, to the arbitration ECU 5, a single upper-limit acceleration and a single lower-limit acceleration that are based on the upper-limit or lower-limit acceleration as a request to the drive actuator DA and the like that is independently generated through execution of the applications A, . . . , Z. Besides, the upper limit-system arbitrator 51 of the arbitration ECU 5 arbitrates the upper-limit accelerations from the auxiliary ECU's 2, 3, and 4, and outputs a single upper-limit acceleration to the running control ECU 7. Furthermore, the lower limit-system arbitrator 52 arbitrates the lower-limit accelerations from the auxiliary ECU's 2, 3, and 4, and outputs a single lower-limit acceleration (including a single lower-limit acceleration accompanied by an accelerator override request) to the running control ECU 7.

The lower-limit arbitrator 71, the substitution arbitrator 72, and the upper-limit arbitrator 73 of the running control ECU 7 arbitrate the driver-requested acceleration made by the driver of the vehicle V from the driver request setter 6 and the upper-limit and lower-limit accelerations from the arbitration ECU 5, and output a final request. The control unit 75 of the running control ECU 7 controls the drive actuator DA based on the final request from the upper-limit arbitrator 73. Besides, the braking request setter 53 of the arbitration ECU 5 sets a braking request to the brake actuator BA, based on an upper-limit acceleration output from the upper limit-system arbitrator 51 and a lower-limit acceleration output from the lower limit-system arbitrator 52 (a substitution request). Furthermore, the brake ECU 8 controls the brake actuator BA based on a braking request from the braking request setter 53 and the like. Thus, the upper-limit and lower-limit accelerations requested from the auxiliary ECU's 2, 3, and 4, namely, the state of the vehicle V acquired by the auxiliary devices mounted in the vehicle V, actuation states of the auxiliary devices, and the like can be reflected on the control of the drive actuator DA and the brake actuator BA. Therefore, the vehicle V can be caused to run (operated) more safely and properly.

It should be noted herein that with a view to properly executing the applications A, . . . , Z installed in the auxiliary ECU's 2, 3, and 4 without interfering with one another, that one of the applications which has generated the upper-limit or lower-limit acceleration corresponding to the final request that is eventually reflected on the control of the drive actuator DA and the like needs to be discriminated in each of the auxiliary ECU's 2, 3, and 4. In order to ensure that the application that has generated the upper-limit or lower-limit acceleration corresponding to the final request can be discriminated easily, it is conceivable to assign proper pieces of identification information (identifiers) to the applications A, . . . , Z. In this case, however, it is difficult to flexibly cope with variations in the number of applications A, . . . , Z.

In view of this, in the control system 1, no proper pieces of identification information (ID's) are assigned to the applications A, . . . , Z, and each of the auxiliary ECU's 2, 3, and 4, namely, each of the discriminators 25, 35, and 45 specifies that one of the applications which has generated the upper-limit or lower-limit acceleration corresponding to the final request. Besides, in order for each of the auxiliary ECU's 2, 3, and 4 to be able to accurately specify that one of the applications which has generated the upper-limit or lower-limit acceleration corresponding to the final request, the discriminator 55 of the arbitration ECU 5 specifies that one of the auxiliary ECU's 2, 3, and 4 which has output the upper-limit or lower-limit acceleration corresponding to the final request, in arbitrating the upper-limit and lower-limit accelerations from the auxiliary ECU's 2, 3, and 4.

Figure 2:
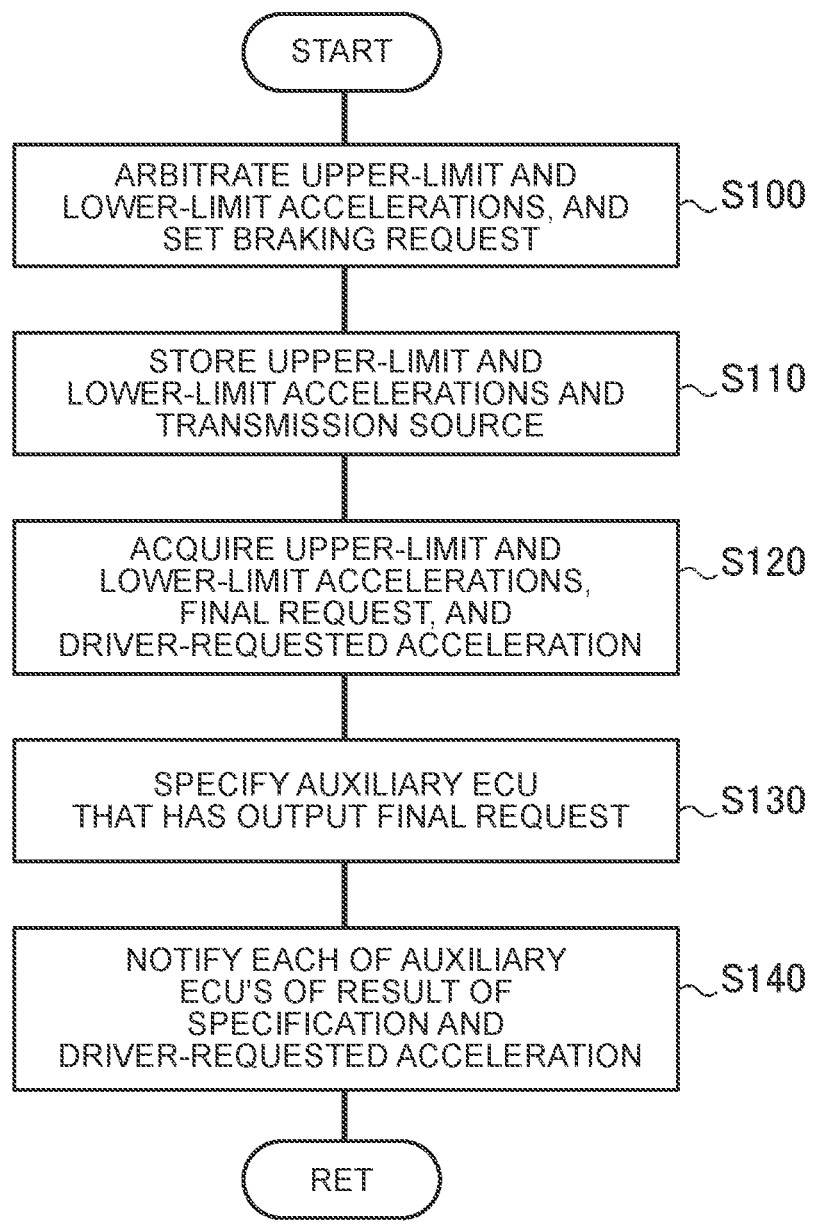
FIG. 2 is a flowchart exemplifying a routine that is executed by arbitrators of the control system of the present disclosure.

FIG. 2 is a flowchart showing a routine that is repeatedly executed at intervals of a predetermined time (a short time) by the arbitration ECU 5 while the system of the vehicle V is activated. Upon the arrival of a timing of executing the routine of FIG. 2, the upper limit-system arbitrator 51 and the lower limit-system arbitrator 52 of the arbitration ECU 5 select (arbitrate) the smallest one of upper-limit or lower-limit accelerations received from the auxiliary ECU's 2, 3, and 4, and output signals indicating the selected single upper-limit or lower-limit acceleration from the corresponding output ports respectively (step S100). Besides, in step S100, the braking request setter 53 sets a braking request to the brake actuator BA, based on the upper-limit acceleration output from the upper limit-system arbitrator 51 and the lower-limit acceleration output from the lower limit-system arbitrator 52 (the substitution request). Furthermore, the upper limit-system arbitrator 51 and the lower limit-system arbitrator 52 store the self-output single upper-limit or lower-limit acceleration into the RAM of the arbitration ECU 5 in association with the input port to which the upper-limit or lower-limit acceleration has been supplied, namely, the auxiliary ECU 2, 3, or 4 as a transmission source (step S110).

Besides, the discriminator 55 of the arbitration ECU 5 acquires a driver-requested acceleration from the driver request setter 6 and a final request from the running control ECU 7 (the upper-limit arbitrator 73) as well as the upper-limit acceleration output from the upper limit-system arbitrator 51 and the lower-limit acceleration output from the lower limit-system arbitrator 52 (step S120). Furthermore, the discriminator 55 compares the upper-limit acceleration, lower-limit acceleration, and driver-requested acceleration acquired in step S120 with the final request, and specifies that one of the auxiliary ECU's 2, 3, and 4 which has output the upper-limit or lower-limit acceleration corresponding to the final request (step S130). In step S130, the discriminator 55 specifies one of the auxiliary ECU's 2, 3, and 4 based on the input port that has received the upper-limit or lower-limit acceleration corresponding to the final request. Besides, when it is determined in step S130 that the driver-requested acceleration corresponds to the final request, the discriminator 55 regards all the auxiliary ECU's 2, 3, and 4 as failing to output the upper-limit or lower-limit acceleration corresponding to the final request.

The discriminator 55 then notifies each of the auxiliary ECU's 2, 3, and 4 of a result of specification obtained in step S130 and the driver-requested acceleration from the driver request setter 6 (step S140), and temporarily ends the routine of FIG. 2. When it is specified that one of the auxiliary ECU's 2, 3, and 4 has output the upper-limit or lower-limit acceleration corresponding to the final request, the discriminator 55 notifies that one of the auxiliary ECU's 2, 3, and 4 that the upper-limit acceleration or the lower-limit acceleration has been selected as the final request, and notifies the other two of the auxiliary ECU's 2, 3, and 4 that the upper-limit acceleration or the lower-limit acceleration has not been selected as the final request, in step S140. Besides, when it is specified that none of the auxiliary ECU's 2, 3, and 4 has output the upper-limit or lower-limit acceleration corresponding to the final request, the discriminator 55 notifies all the auxiliary ECU's 2, 3, and 4 that the upper-limit acceleration or the lower-limit acceleration has not been selected as the final request.

Figure 3:
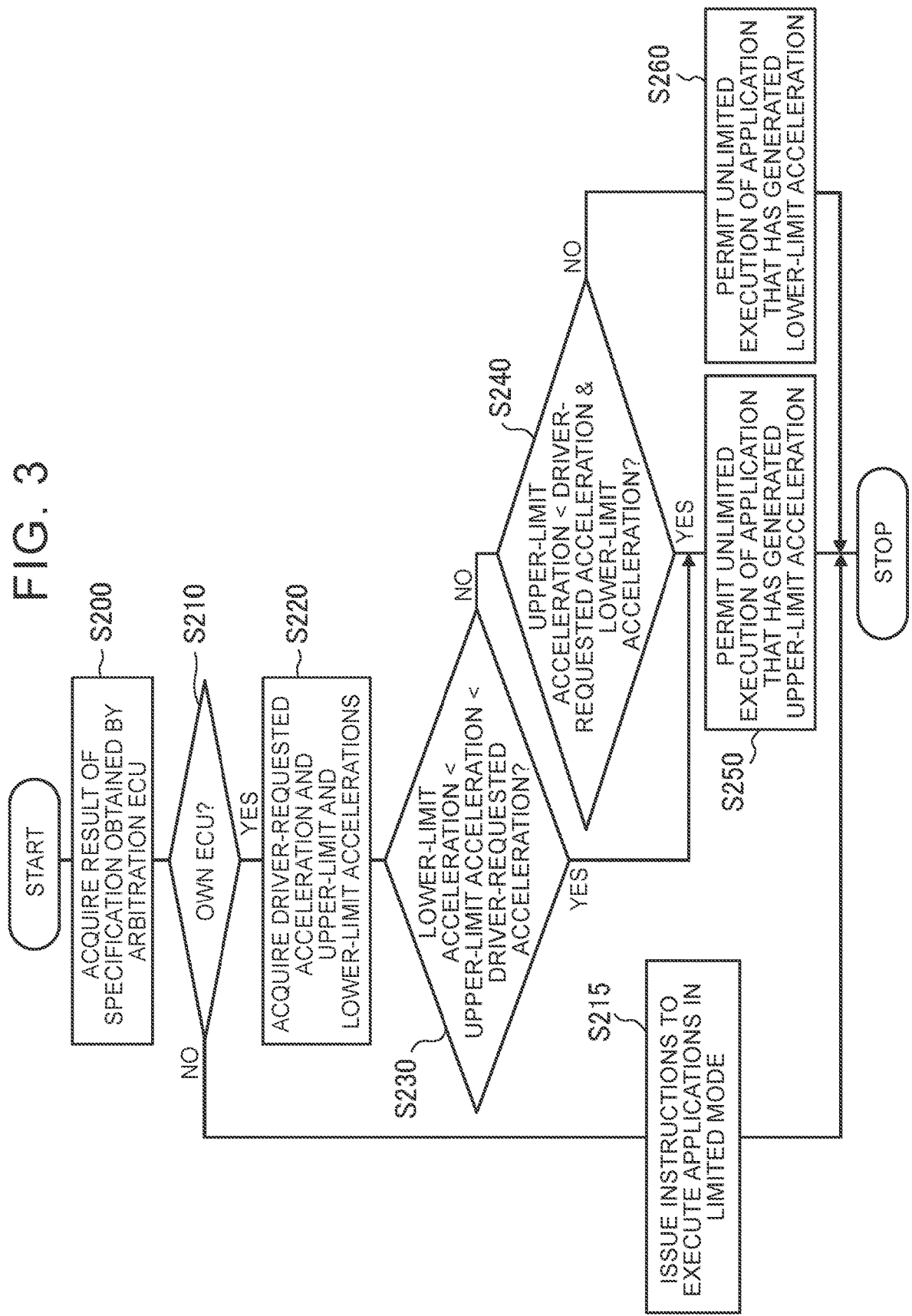
FIG. 3 is a flowchart exemplifying a routine that is executed by request generation devices of the control system of the present disclosure.

FIG. 3 is a flowchart showing a procedure of specifying the application that has generated an upper-limit or lower-limit acceleration corresponding to a final request by the discriminators 25, 35, and 45 of the auxiliary ECU's 2, 3, and 4. In this case, the procedure in which the discriminator 25 of the auxiliary ECU 2 specifies the application that has generated the upper-limit or lower-limit acceleration corresponding to the final request will be described with reference to FIG. 3.

When the auxiliary ECU 2 receives a result of specification by the discriminator 55 from the arbitration ECU 5 and a driver-requested acceleration, the discriminator 25 of the auxiliary ECU 2 starts a routine of FIG. 3, and acquires the result of specification from the arbitration ECU 5 (the discriminator 55) (step S200). Furthermore, the discriminator 25 determines whether or not the arbitration ECU 5 has specified that the auxiliary ECU 2 has output the upper-limit or lower-limit acceleration corresponding to the final request (step S210). When it is determined that the arbitration ECU 5 has specified that the auxiliary ECU 2 has not output the upper-limit acceleration or the like corresponding to the final request (NO in step S210), the discriminator 25 issues instructions to execute the applications A, B, and C in a limited mode adapted to a state where the auxiliary ECU 2 has not output the upper-limit or lower-limit acceleration corresponding to the final request (step S215), and ends the routine of FIG. 3. In the limited mode, only processes determined in advance by the first, second, and third request generation modules 2A, 2B, and 2C are performed, or the execution itself of the application A, B, or C is stopped.

On the other hand, when it is determined that the arbitration ECU 5 has specified that the auxiliary ECU 2 has output the upper-limit acceleration or the like corresponding to the final request (YES in step S210), the discriminator 25 acquires newest upper-limit and lower-limit accelerations stored in the RAM of the auxiliary ECU 2 (output from the auxiliary ECU 2), and a driver-requested acceleration from the driver request setter 6 (step S220). Subsequently, the discriminator 25 determines whether or not the upper-limit acceleration acquired in step 5220 is smaller than the driver-requested acceleration and larger than the lower-limit acceleration (step S230). Furthermore, when the result of the determination in step 5230 is negative (NO in step S230), the discriminator 25 determines whether or not the upper-limit acceleration acquired in step 5220 is smaller than the driver-requested acceleration and the lower-limit acceleration (step S240).

It should be noted herein that when the upper-limit acceleration is smaller than the driver-requested acceleration and larger than the lower-limit acceleration, the upper-limit acceleration is selected as the final request through selection of the minimum in the upper-limit arbitrator 73 of the running control ECU 7, via arbitration by the lower-limit arbitrator 71 and the substitution arbitrator 72 of the running control ECU 7. By the same token, when the upper-limit acceleration is smaller than the lower-limit acceleration and the driver-requested acceleration as well, the upper-limit acceleration is selected as the final request through selection of the minimum in the upper-limit arbitrator 73 of the running control ECU 7, via arbitration by the lower-limit arbitrator 71 and the substitution arbitrator 72 of the running control ECU 7. Therefore, when the result of the determination in step S230 or S240 is positive (YES in step S230 or S240), the discriminator 25 permits the execution of that one of the applications A, B, and C which has generated the upper-limit acceleration stored in the RAM of the auxiliary ECU 2 in an unlimited mode (a normal mode), issues instructions to execute the other two of the applications A, B, and C in the limited mode determined in advance (step S250), and ends the routine of FIG. 3.

In contrast, when the result of the determination in step S240 is negative, the upper-limit acceleration is larger than the lower-limit acceleration, and the lower-limit acceleration is selected as the final request through selection of the minimum in the upper-limit arbitrator 73 of the running control ECU 7, via arbitration by the lower-limit arbitrator 71 and the substitution arbitrator 72 of the running control ECU 7. Therefore, when the result of the determination in step S240 is negative, the discriminator 25 permits the execution of that one of the applications A, B, and C which has generated the lower-limit acceleration stored in the RAM of the auxiliary ECU 2 in the unlimited mode (the normal mode), issues instructions to execute the other two of the applications A, B, and C in the limited mode determined in advance (step S260), and ends the routine of FIG. 3. Until the fulfillment of a predetermined cancellation condition after the processing of step S250 or S260, that one of the applications A, B, and C which has generated the upper-limit acceleration or the lower-limit acceleration is executed without being limited in particular, and the other two of the applications A, B, and C are executed while being limited in a manner determined in advance.

As described above, in the control system 1 for the vehicle V, the running control ECU 7 as the actuator control apparatus controls the drive actuator DA based on a final request that is obtained by arbitrating the upper-limit and lower-limit accelerations from the arbitration ECU 5 as the arbitrator of the control system 1 and the driver-requested acceleration requested by the driver of the vehicle V, and transmits the final request to the arbitration ECU 5. Besides, the arbitration ECU 5 specifies that one of the auxiliary ECU's 2, 3, and 4 which has output the upper-limit or lower-limit acceleration corresponding to the final request, based on the final request from the running control ECU 7 and the self-output upper-limit and lower-limit accelerations (stored in the RAM), and notifies the auxiliary ECU's 2, 3, and 4 as the request generation devices of a result of specification (steps S120 to S140 of FIG. 2). Furthermore, that one of the auxiliary ECU's 2, 3, and 4 which has been specified by the arbitration ECU 5 specifies the application that has generated a request corresponding to the final request based on the self-output upper-limit and lower-limit accelerations (stored in the RAM) and the driver-requested acceleration from the arbitration ECU 5 (steps S220 to S260 of FIG. 3).

As described hitherto, that one of the auxiliary ECU's 2, 3, and 4 which has output the upper-limit or lower-limit acceleration corresponding to the final request can be specified in the arbitration ECU 5, by feeding back the final request made by the running control ECU 7 to the arbitration ECU 5. Then, when that one of the auxiliary ECU's 2, 3, and 4 which has output the upper-limit or lower-limit acceleration corresponding to the final request is specified, the application that has generated the request corresponding to the final request can be specified easily and accurately, by comparing the self-output upper-limit and lower-limit accelerations with the driver-requested acceleration in that one of the auxiliary ECU's 2, 3, and 4. Accordingly, in the control system 1, the application that has generated the request that is eventually reflected on the control of the drive actuator DA and the like can be specified without assigning pieces of identification information (identifiers) to the applications A, ..., Z mounted in the auxiliary ECU's 2, 3, and 4 respectively. As a result, the applications A, ..., Z can be properly executed without interfering with one another, while flexibly coping with variations in the number of applications A, ..., Z in the control system 1.

Besides, in the control system 1, when the self-output upper-limit acceleration is smaller than the driver-requested acceleration and larger than the self-output lower-limit acceleration (YES in step S230) or when the self-output upper-limit acceleration is smaller than the request made by the driver and the self-output lower-limit acceleration (YES in step S240), that one of the auxiliary ECU's 2, 3, and 4 which has been specified by the arbitration ECU 5 permits the execution of the application that has generated the self-output upper-limit acceleration in the unlimited mode (step S250). Otherwise (NO in step S240), that one of the auxiliary ECU's 2, 3, and 4 which has been specified by the arbitration ECU 5 permits the execution of the application that has generated the self-output lower-limit acceleration in the unlimited mode (step S260). Thus, the application that has generated the request that is eventually reflected on the control of the drive actuator DA can be specified accurately and executed properly.

Furthermore, in the foregoing embodiment, the applications A, C, and Q give the lower-limit acceleration and an accelerator override prohibition request to invalidate the operation of the accelerator pedal (a request for a driving force) by the driver of the vehicle V to the arbitrator 20 or 30. Besides, when selecting the lower-limit acceleration accompanied by the accelerator override prohibition request through arbitration, the arbitration ECU 5 gives the lower-limit acceleration to the running control ECU 7 as a substitution request. Furthermore, when accepting the lower-limit acceleration (the substitution request) accompanied by the accelerator override prohibition request, the running control ECU 7 invalidates the driver-requested acceleration requested by the driver, and adopts the upper-limit or lower-limit acceleration from the arbitration ECU 5 as the final request. Thus, when the override prohibition request is generated by the application A, C, or Q, the drive actuator DA and the like and hence the vehicle V can be controlled properly.

Besides, the drive actuator DA that is a motive power generation device that generates a motive power for running can be controlled in accordance with the upper-limit and lower-limit accelerations from the auxiliary ECU's 2, 3, and 4, while properly executing the applications A, ..., Z, by causing each of the auxiliary ECU's 2, 3, and 4 to specify the application that has generated the upper-limit acceleration as the first request or the lower-limit acceleration as the second request that corresponds to the final request. Furthermore, in the foregoing embodiment, the arbitration ECU 5 includes the braking request setter 53 that sets a request to the brake actuator BA that applies a braking force to the vehicle V based on the self-output upper-limit acceleration and the self-output lower-limit acceleration, and that gives the set request to the brake ECU 8 as the second actuator control apparatus that controls the brake actuator BA. Thus, the braking force applied to the vehicle V can be well restrained from becoming deficient.

Incidentally, in the control system 1, each of the first and second requests to be arbitrated may not necessarily be an upper-limit or lower-limit acceleration as a kinetic controlled variable in the longitudinal direction of the vehicle V. That is, in the control system 1, each of the first and second requests to be arbitrated may be an upper limit or a lower limit of at least one of a steering angle, a yaw rate, and a radius of rotation as kinetic controlled variables in the lateral direction of the vehicle V. Furthermore, the first request may include both the upper-limit acceleration and the upper limit of the kinetic controlled variable in the lateral direction, and the first request may include both the lower-limit acceleration and the lower limit of the kinetic controlled variable in the lateral direction.

As described above, in the control system for the vehicle of the present disclosure, each of the request generation devices outputs the single first request and the single second request that are based on the request generated by the at least one application mounted in each of the request generation devices. Besides, the arbitrator arbitrates the first requests and the second requests from the request generation devices, and outputs the single first request and the single second request. Furthermore, the actuator control apparatus controls the actuator based on the final request that is obtained by arbitrating the first request and the second request from the arbitrator and the request made by the driver of the vehicle, and transmits the final request to the arbitrator. Besides, the arbitrator specifies the request generation device that has output the first or second request corresponding to the final request, based on the final request from the actuator control apparatus, the self-output first request, and the self-output second request, and notifies the request generation devices of a result of specification. Furthermore, the request generation device specified by the arbitrator specifies the application that has generated the request corresponding to the final request, based on the self-output first request, the self-output second request, and the request made by the driver.

As described hitherto, the request generation device that has output the first or second request corresponding to the final request can be specified in the arbitrator, by feeding back the final request made by the actuator control apparatus to the arbitrator. Then, when the request generation device that has output the first or second request corresponding to the final request is specified, the application that has generated the request corresponding to the final request can be specified by comparing the self-output first and second requests with the request made by the driver in the request generation device. Accordingly, in the control system for the vehicle of the present disclosure, the application that has generated the request that is eventually reflected on the control of the actuator can be specified without assigning pieces of identification information to the applications mounted in the request generation devices respectively. As a result, the applications can be properly executed while flexibly coping with variations in the number of applications in the control system.

Besides, the first request may be an upper-limit acceleration of the vehicle. The second request may be a lower-limit acceleration of the vehicle. The actuator may include a drive actuator that generates a motive power for running.

That is, according to the control system for the vehicle of the present disclosure, the drive actuator can be properly controlled in accordance with the upper-limit and lower-limit accelerations from the request generation devices, while properly executing the applications mounted in the request generation devices respectively.

Furthermore, the actuator may include a brake actuator that is controlled by a second actuator control apparatus and that applies a braking force to the vehicle. The arbitrator may set a request to the brake actuator based on the self-output first request and the self-output second request, and give the set request to the second actuator control apparatus.

Besides, the request generation device specified by the arbitrator may permit the execution of the application that has generated the self-output first request when the self-output first request is smaller than the request made by the driver and larger than the self-output second request, or when the self-output first request is smaller than the request made by the driver and the self-output second request, and may otherwise permit the execution of the application that has generated the self-output second request.

Thus, the application that has generated the request that is eventually reflected on the control of the actuator can be specified accurately and executed properly.

Furthermore, the at least one application may give the second request and an override prohibition request to invalidate the request made by the driver to the arbitrator. The arbitrator may give the second request to the actuator control apparatus as a substitution request, when selecting the second request accompanied by the override prohibition request through arbitration. The actuator control apparatus may invalidate the request made by the driver, and adopt one of the first and second requests from the arbitrator as the final request, when accepting the substitution request.

Thus, the actuator can be properly controlled when the override prohibition request is generated by one of the applications.

Besides, according to the control method for the vehicle of the present disclosure, the application that has generated the request that is eventually reflected on the control of the actuator can be specified without assigning pieces of identification information to the applications mounted in the request generation devices respectively. As a result, the applications can be properly executed while flexibly coping with variations in the number of applications in the control system.

Moreover, it goes without saying that the present disclosure should not be limited at all to the foregoing embodiment but can be altered in various manners within the scope of the extension of the present disclosure. Furthermore, the foregoing embodiment is nothing more than a concrete form of the disclosure described in the section of the summary, and does not limit the elements of the disclosure described in the section of the summary.

The present disclosure can be utilized in a vehicle manufacturing industry and the like.

What is claimed is:

1. A control system for a vehicle having at least one actuator, the control system comprising:
   a plurality of request generation devices each of which is mounted with at least one application that independently generates a request to the actuator, and each of which outputs a single first request and a single second request that are based on the request generated by the at least one application;
   an arbitrator that arbitrates the first requests and the second requests from the plurality of request generation devices, and that outputs a self-output first request and a self-output second request; and
   an actuator control apparatus that controls the actuator based on a final request that is obtained by arbitrating the self-output first request and the self-output second request from the arbitrator and a request made by a driver of the vehicle, wherein
   the actuator control apparatus transmits the final request to the arbitrator,
   the arbitrator specifies a request generation device of the plurality of request generation devices that has output the first or second request corresponding to the final request, based on the final request from the actuator control apparatus, the self-output first request, and the self-output second request, and notifies the plurality of request generation devices of a result of specification, and
   the request generation device specified by the arbitrator specifies the application that has generated the request corresponding to the final request, based on the self-output first request, the self-output second request, and the request made by the driver.

2. The control system according to claim 1, wherein
   the first request is an upper-limit acceleration of the vehicle,
   the second request is a lower-limit acceleration of the vehicle, and
   the actuator includes a drive actuator that generates a motive power for running.

3. The control system according to claim 2, wherein
   the actuator further includes a brake actuator that is controlled by a second actuator control apparatus and that applies a braking force to the vehicle, and
   the arbitrator sets a request to the brake actuator based on the self-output first request and the self-output second request, and gives the set request to the second actuator control apparatus.

4. The control system according to claim 2, wherein
   the request generation device specified by the arbitrator permits execution of the application that has generated the first request corresponding to the self-output first request when the self-output first request is smaller than the request made by the driver and larger than the second request corresponding to the self-output second request, or when the self-output first request is smaller than the request made by the driver and the self-output second request, and otherwise permits execution of the application that has generated the second request corresponding to the self-output second request.

5. The control system according to claim 2, wherein
   the at least one application gives the second request and an override prohibition request to invalidate the request made by the driver to the arbitrator,
   the arbitrator gives the second request to the actuator control apparatus as a substitution request, when selecting the second request accompanied by the override prohibition request through arbitration, and
   the actuator control apparatus invalidates the request made by the driver, and adopts one of the self-output first request and the self-output second request from the arbitrator as the final request, when accepting the substitution request.

6. A control method for a vehicle including at least one actuator, a plurality of request generation devices each of which is mounted with at least one application that independently generates a request to the actuator and each of which outputs a single first request and a single second request that are based on the request generated by the at least one application, an arbitrator that arbitrates the first requests and the second requests from the plurality of request generation devices and that outputs a self-output first request and a self-output second request, and an actuator control apparatus that controls the actuator based on a final request that is obtained by arbitrating the self-output first request and the self-output second request from the arbitrator and a request made by a driver of the vehicle, the control method comprising:

causing the actuator control apparatus to transmit the final request to the arbitrator;
  causing the arbitrator to specify a request generation device of the plurality of request generation devices that has output the first or second request corresponding to the final request, based on the final request from the actuator control apparatus, a self-output first request, and a self-output second request, and to notify the plurality of request generation devices of a result of specification; and
  causing the request generation device specified by the arbitrator to specify the application that has generated the request corresponding to the final request, based on the self-output first request, the self-output second request, and the request made by the driver.

* * * * *